S. H. ECKMANN & J. WAGNER.
SAFETY SPEED CONTROL APPARATUS FOR MOTORS.
APPLICATION FILED MAY 11, 1912.
1,138,647.
Patented May 11, 1915.
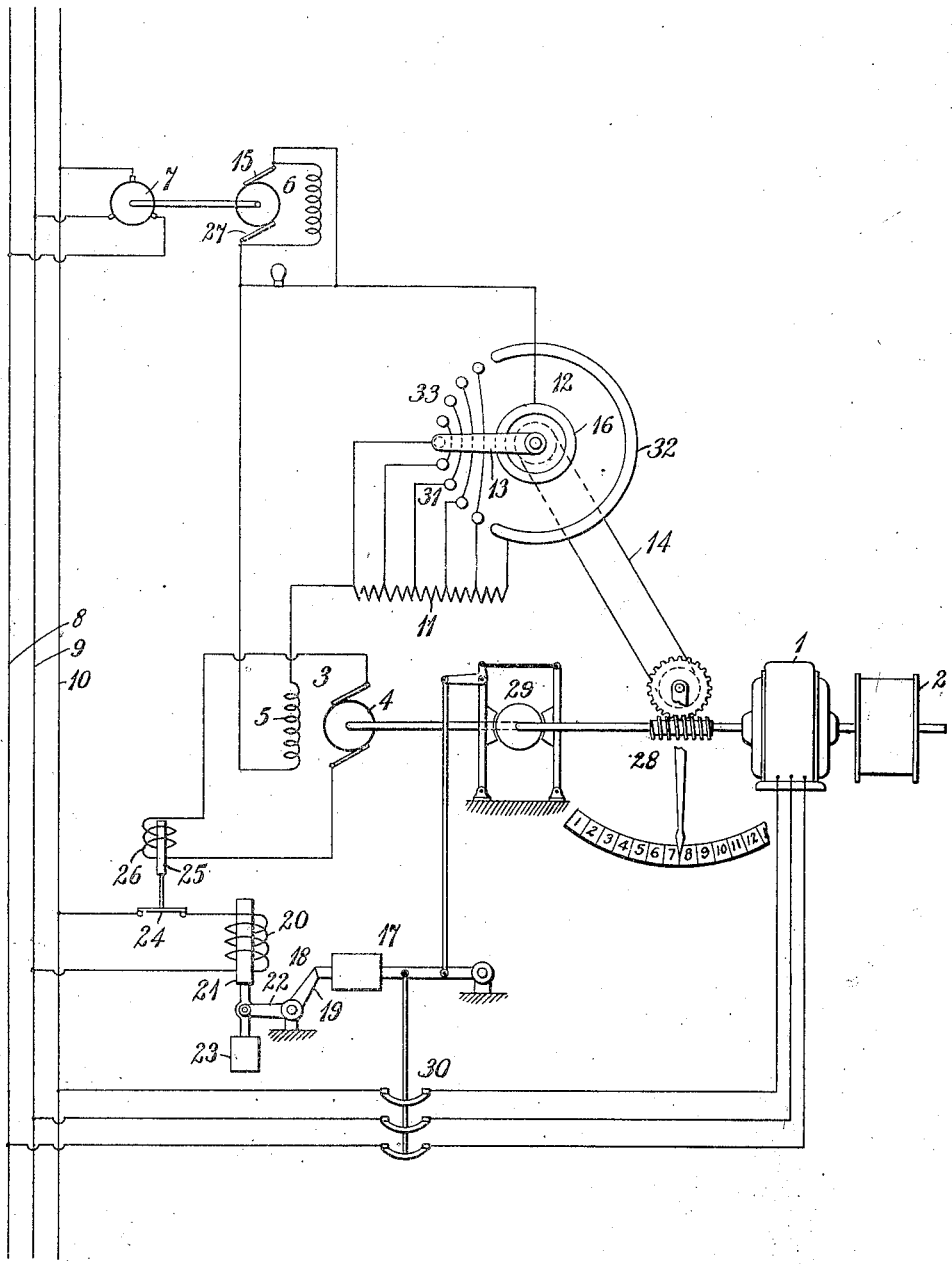

UNITED STATES PATENT OFFICE.

SIEGMUND HANS ECKMANN AND JAMES WAGNER, OF MANCHESTER, ENGLAND, ASSIGNORS TO WESTINGHOUSE ELECTRIC AND MANUFACTURING COMPANY, A CORPORATION OF PENNSYLVANIA.

SAFETY SPEED-CONTROL APPARATUS FOR MOTORS.

1,138,647.  Specification of Letters Patent.  Patented May 11, 1915.

Application filed May 11, 1912. Serial No. 696,767.

*To all whom it may concern:*

Be it known that we, SIEGMUND HANS ECKMANN and JAMES WAGNER, subjects of the Emperor of Germany, and residents of Manchester, England, in the county of Lancaster, have invented a new and useful Improvement in Safety Speed-Control Apparatus for Motors, of which the following is a specification.

Our invention relates to safety speed-control apparatus for motors used for driving reciprocating devices such, for instance, as winding motors for mining hoists and, although not limited in this respect, the invention will, for the sake of convenience, be described in connection with a motor used for this purpose. Except in cases in which automatic systems of control are employed, the safe operation of winding motors for hoists depends, to a great extent, upon the attention of the motorman. For example, should the motorman permit the motor to operate too rapidly or neglect to cut off the power and apply the brakes at a certain predetermined position of the cage, it might be impossible for him to bring the cage to rest against the kinetic energy of the moving masses. It is therefore of the utmost importance to keep the distance through which the hoist is operated at full speed within certain limits and to reduce the speed to certain predetermined values at certain distances from the place at which the cage is to be brought to rest.

The present invention has for its object to provide improved apparatus for automatically cutting off the supply of power from, and applying the brakes to, the motor in case the speed of the cage, or other similar device, exceeds that previously determined upon for any particular position.

According to the present invention, a separately excited generator is provided which is driven so that its speed varies directly in accordance with the speed of the cage or other similar device. The excitation of the generator is varied in an inverse sense to the predetermined variations in speed of the cage, so that, should the speed of the latter exceed, at any time, the predetermined speed, the electromotive force of the generator will increase, said increase in the electromotive force of the generator being utilized to cause the supply of power to be cut off from, and the brakes applied to, the motor to check the speed of the latter.

In order that the nature of the invention may be clearly understood, one embodiment thereof, as applied to the control of an electric motor operating a mining hoist, will now be described by way of example, reference being had to the accompanying drawing, the single figure of which is a diagram of the mechanism and circuits.

The winding motor 1, here shown as an alternating current motor, is indicated as driving a winding drum 2. A small direct current generator 3 has its armature 4 directly coupled to the winding drum 2 with the result that its speed will correspond to that of the cage of the hoist, which is, of course, raised or lowered by rotating the winding drum 2. The field winding 5 of the direct current generator 3 is excited from a source of constant voltage which, in the present instance, is an exciter 6 driven by a motor 7 that is connected to the supply mains 8, 9, 10 of a three-phase source. One terminal of the field winding 5 is connected to one brush 27 of the exciter 6 and its other terminal is connected to one terminal of a variable resistor 11. The ends and intermediate points of the resistor 11 are connected to the stationary contact terminals of a switch 12, the movable contact arm 13 of which is adapted to be driven from the depth indicator 28 by means of a band 14. The other brush 15 of the exciter 6 is connected to a contact member 16 of the switch 12 with which the arm 13 continuously makes contact.

The safety device, which is a common feature of electrically operated mining hoists, is indicated diagrammatically at 17 and is adapted, when released, to apply the emergency brake 29 and open the circuit breaker 30 that controls the supply of current to the motor 1. The safety device 17 is normally maintained out of operation by a releasing device, here shown as a two-armed lever 18 pivoted to some fixed part, one arm 19 of which engages and holds the safety device in its "off" position, so long as current flows in a solenoid 20 the movable core 21 of which is attached to the other arm 22 and is provided with a weight 23. The solenoid 20 may be supplied with current from any convenient source, such as the mains 9 and 10 of the supply circuit, and, so long as current flows in this solenoid, the core will be lifted against the action of the weight 23 and held in the position shown in the drawing, in which the arm 19 engages the safety device 17 and maintains it out of operation.

A switch 24 for making and breaking the circuit of the solenoid 20 is adatped to be operated by the movable core 25 of a solenoid 26, the terminals of which are connected to the brushes of the direct current generator 3. Normally, the movable core member 25 of the solenoid 26 occupies its lowermost position, as shown in the drawing, in which the switch 24 is closed and the circuit of the solenoid 20 completed. The core 25 will occupy the position just stated so long as the voltage produced by the generator 3 does not rise above a predetermined value, but, should such a rise in voltage occur, the core 25 will be lifted and the switch 24 operated to open the circuit of the solenoid 20.

The various speeds which the cage of a mining hoist should properly have at certain positions of its travel are usually predetermined and shown on a speed diagram. The amount of the resistor 11 in circuit with the field winding 5 of the generator 3 is varied by the switch 12 in such manner that the excitation of the generator 3 will vary in an inverse sense to the pre-arranged speeds of the cage. In the particular arrangement described herein, the arm 13 of the switch 12, which is driven from the depth indicator 28, is arranged to make one complete revolution during the travel of the cage between its extreme limits in either direction.

The generator 3 is designed to have a straight line characteristic, and the various contact terminals of the switch 12 and the intermediate points of the resistor connected thereto are so arranged and determined that, as the movable arm 13 travels over them, the resistance in circuit with the field winding 5 will be varied to such an extent as is necessary to maintain the voltage of the generator 3 constant, provided the speed of the armature 4 corresponds to the pre-arranged speed of the cage. As the armature 4 is driven directly from the winding drum 2, this will occur so long as the cage maintains its pre-arranged speeds. In case the speed of the cage exceeds that which is predetermined for any particular position, the speed of the armature 3 will increase beyond the speed corresponding to the excitation of its field magnet, with the result that the voltage generated thereby will rise. The solenoid 26, being excited beyond the normal, will lift the plunger 25, thereby opening the switch 24 and consequently breaking the circuit of the solenoid 20, whereupon the plunger 21 will fall, under the action of the weight 23, and move the arms 22 and 19 to release the safety device 17, with the result that the emergency brake 29 will be applied and the supply of current to the motor 1 cut off.

The position of the movable arm 13 shown in the drawing is that which it occupies when the cage is at rest, either at the top or the bottom of the hoist. In this position of the arm, all of the resistor 11 is cut out of circuit with the field winding 5, this circuit being then as follows: from the brush 27 of the exciter 6 through the field winding 5, the arm 13 and the contact member 16 to the other brush 15 of the exciter. As the cage rises and its speed increases, the arm, driven by the depth indicator and rotating in a counter clockwise direction, is moved over the lower set of contact terminals 31 of the switch 12 to successively include portions of the resistor 11 in circuit with the field winding 5. As soon as the cage has reached that position at which its maximum speed should occur, the arm 13 will engage the outer circumferential contact terminal 32 and the whole of the resistor 11 will be in circuit with the field winding 5. With the maximum speed of the cage, it will thus be seen that all of the resistor 11 is in circuit with the field winding and the excitation of the generator 3 is therefore reduced sufficiently to prevent the voltage of its armature from rising above the predetermined value.

As the cage approaches the upper limit of its travel, the arm 13, still rotating in a counter clockwise direction, will travel in succession over the upper set 33 of contact terminals and gradually cut out the resistor 11. The strength of the field of the generator 3 will therefore be correspondingly increased as the cage nears the upper limit of its travel, where its speed should fall, in accordance with that indicated on the speed diagram, and the voltage supplied to the terminals of the solenoid 26 will be maintained substantially constant, notwithstanding the decrease in speed of the armature 4 which should occur.

Of course it will be understood that, in case the winding drum is operated by a steam engine, the safety device will operate to cut off the supply of steam instead of opening the circuit breaker, as described above, the emergency brake being, however, automatically applied in either case, thereby checking the speed of the motor.

The speed control apparatus of this invention may be also adapted to operate when the cage is being lowered and the winding motor is delivering a braking current or is operating regeneratively, in case the speed of the cage, at any position, should exceed that predetermined upon for such position by a certain amount.

We claim as our invention:

1. The combination with a motor for driving a reciprocating load at predetermined normal speeds that vary in accordance with the position of said load, of a safety control apparatus comprising an electric generator the speed of which corresponds to that of the reciprocating load and the excitation of which is varied inversely as the predetermined normal speeds of the reciprocating load vary, whereby an excessive speed of the load effects an increase in the electromotive force of said generator to cut off the supply of power and apply a brake to the motor.

2. The combination with a motor for driving a load at a plurality of predetermined normal speeds and an electric generator driven at speeds corresponding to those of said load, an electromagnetically controlled safety device governed by said generator and means for varying the field excitation of said generator inversely with the predetermined normal speeds of the load.

3. The combination with a motor for driving a load in each of two directions at predetermined varying speeds for accelerating and retarding the same and at a substantially uniform speed relatively high between acceleration and retardation periods, of an electromagnetically controlled safety device, an electric generator geared or coupled to said load and providing the current for the controlling circuit of said safety device, an exciter for the field magnet of said generator and a rheostat for automatically varying the current in the exciter circuit in accordance with the predetermined speeds of the load.

4. The combination with a hoist drum, and an electric generator coupled or geared together, of a motor for normally driving said drum and generator at certain predetermined speeds, a safety device adapted to be governed by electrical energy supplied by said generator, an exciter for said generator and a rheostat for the exciter circuit that is automatically operated to compensate for the varying speed of the generator under normal operating conditions.

5. The combination with a motor for normally driving a reciprocating load at different predetermined speeds, and a generator driven at corresponding speeds, of a safety device that is governed by electrical energy from said generator, a constant speed exciter and a rheostat for the exciter circuit that is automatically operated to compensate for the normal varying speeds of the generator.

In testimony whereof, we have hereunto subscribed our names this 22nd day of April, 1912.

SIEGMUND HANS ECKMANN.
JAMES WAGNER.

Witnesses:
JAS. STEWART BROADFOOT,
H. R. KITSON.